(12) United States Patent
Jung

(10) Patent No.: US 12,462,407 B2
(45) Date of Patent: Nov. 4, 2025

(54) DEPTH ESTIMATION METHOD IN AN IMMERSIVE VIDEO CONTEXT

(71) Applicant: Tencent Cloud Europe (France) SAS, Paris (FR)

(72) Inventor: Joël Jung, Paris (FR)

(73) Assignee: Tencent Cloud Europe (France) SAS, Paris (FR)

( * ) Notice: Subject to any disclaimer, the term of this patent is extended or adjusted under 35 U.S.C. 154(b) by 92 days.

(21) Appl. No.: 18/367,337

(22) Filed: Sep. 12, 2023

(65) Prior Publication Data

US 2023/0419519 A1 Dec. 28, 2023

Related U.S. Application Data

(63) Continuation of application No. PCT/IB2021/000725, filed on Oct. 5, 2021.

(51) Int. Cl.
*G06T 7/50* (2017.01)
*H04N 13/161* (2018.01)
*H04N 13/172* (2018.01)
*H04N 13/00* (2018.01)

(52) U.S. Cl.
CPC ............ *G06T 7/50* (2017.01); *H04N 13/161* (2018.05); *H04N 13/172* (2018.05); *G06T 2207/10016* (2013.01); *H04N 2013/0081* (2013.01)

(58) Field of Classification Search
CPC . G06T 2207/10016; G06T 2207/20021; G06T 7/50; G06T 7/55; H04N 13/161; H04N 13/172; H04N 2013/0081; H04N 348/43
USPC .......................................................... 348/43
See application file for complete search history.

(56) References Cited

U.S. PATENT DOCUMENTS

| 2010/0020884 A1* | 1/2010 | Pandit | H04N 19/61 375/E7.076 |
| 2012/0314027 A1* | 12/2012 | Tian | H04N 19/54 348/43 |

(Continued)

FOREIGN PATENT DOCUMENTS

CN 105191319 B * 8/2019 ........... H04N 19/597

OTHER PUBLICATIONS

International Search Report issued Aug. 26, 2022 in Application No. PCT/IB2021/000725, pp. 1-15.

*Primary Examiner* — Behrooz M Senfi
(74) *Attorney, Agent, or Firm* — ArentFox Schiff LLP

(57) ABSTRACT

A method of synthesizing an image includes receiving a coded video stream corresponding to different views of a scene acquired by a plurality of cameras, and identifying one or more derivable depth blocks of a target depth map corresponding to an image of the coded video stream. The method further includes determining a corresponding operation to derive a depth of each of the one or more derivable depth blocks, the operation being applied to a depth of a reference depth block included in a depth map of a reference image in the coded video bitstream. The method further includes obtaining the target depth map corresponding to the image by executing the corresponding operation of the respective derivable depth block, and synthesizing a new image according to the target depth map and at least one decoded image from the coded video stream.

20 Claims, 8 Drawing Sheets

(56) References Cited

U.S. PATENT DOCUMENTS

2014/0168362 A1\* 6/2014 Hannuksela ......... H04N 13/161
  348/43
2020/0288114 A1\* 9/2020 Lakshman ........... H04N 13/383

\* cited by examiner

[Fig. 1]
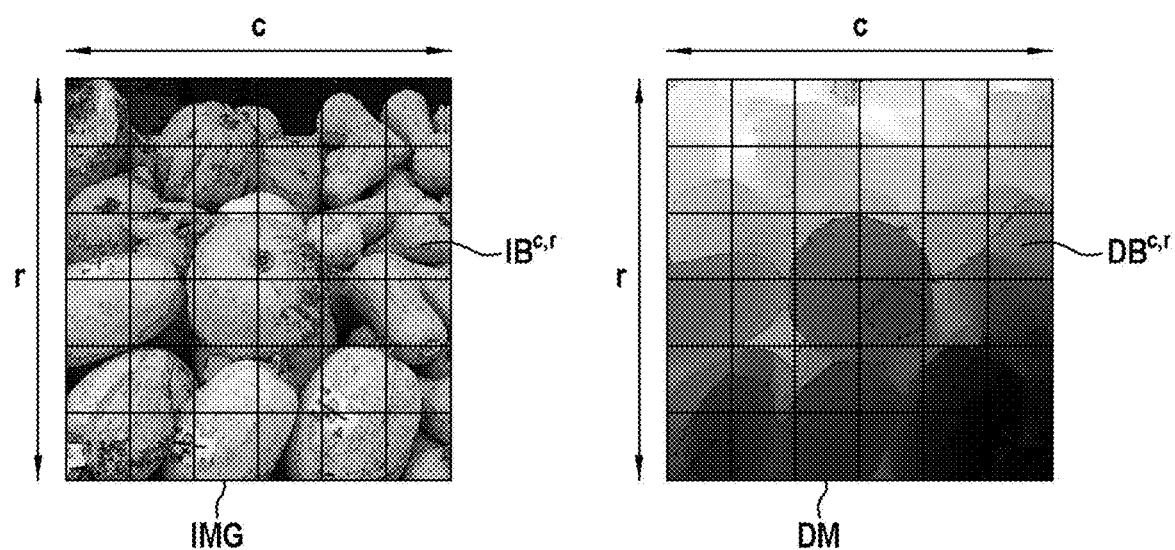

[Fig. 2]
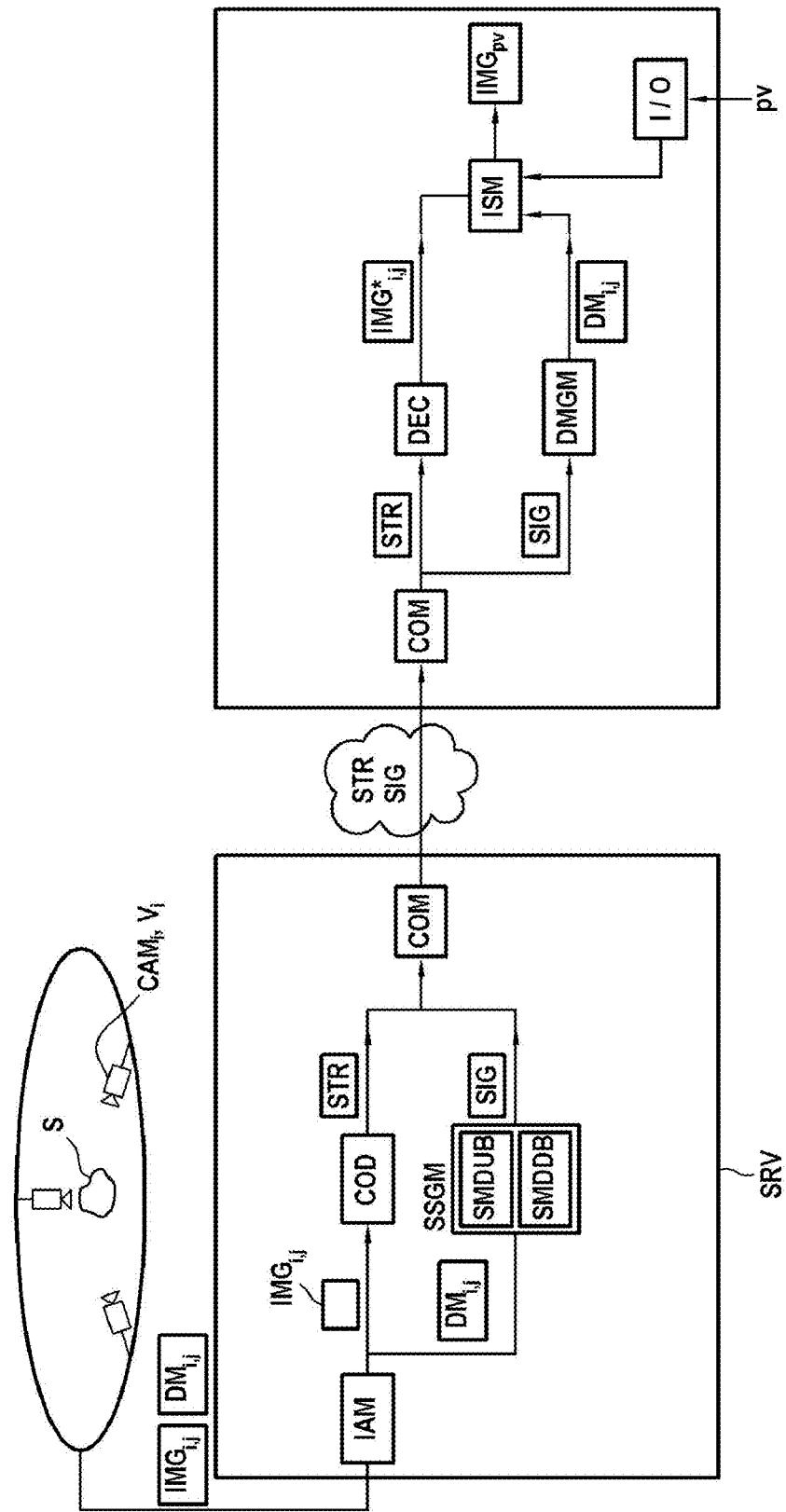

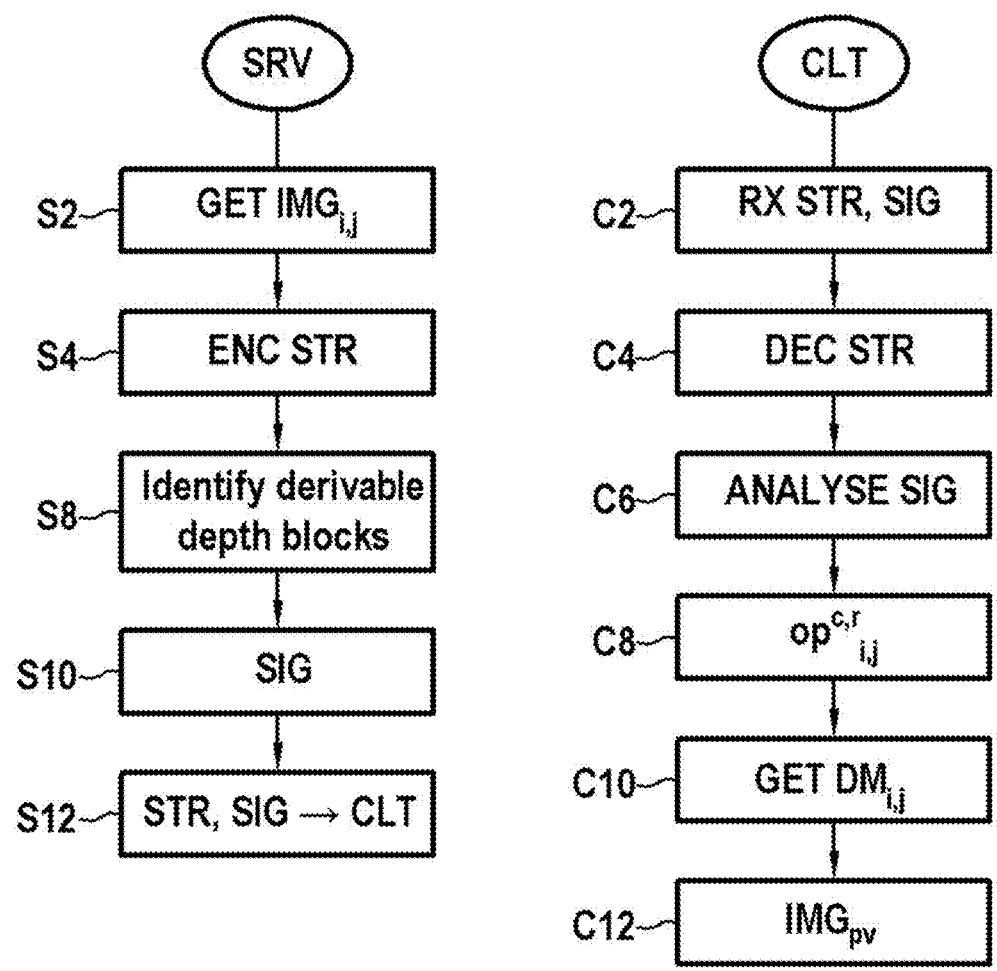
[Fig. 3]

[Fig. 4A]
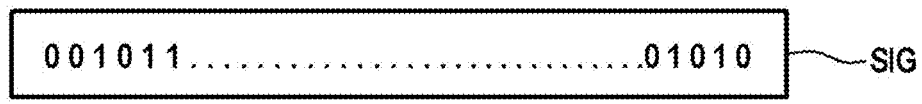
[Fig. 4B]
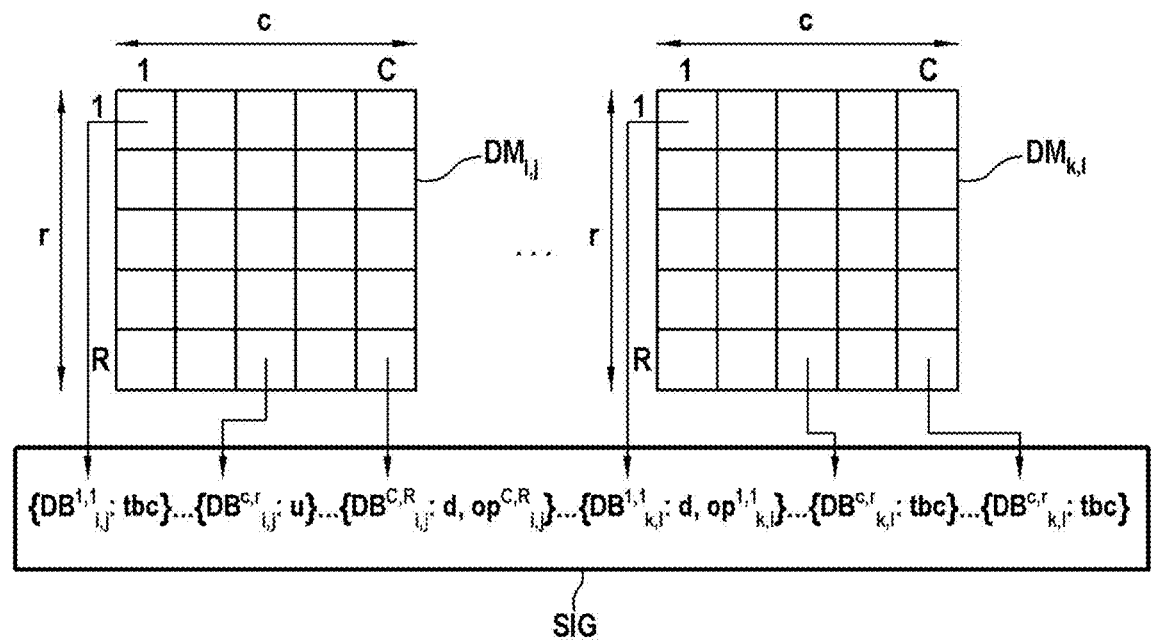

[Fig. 5]
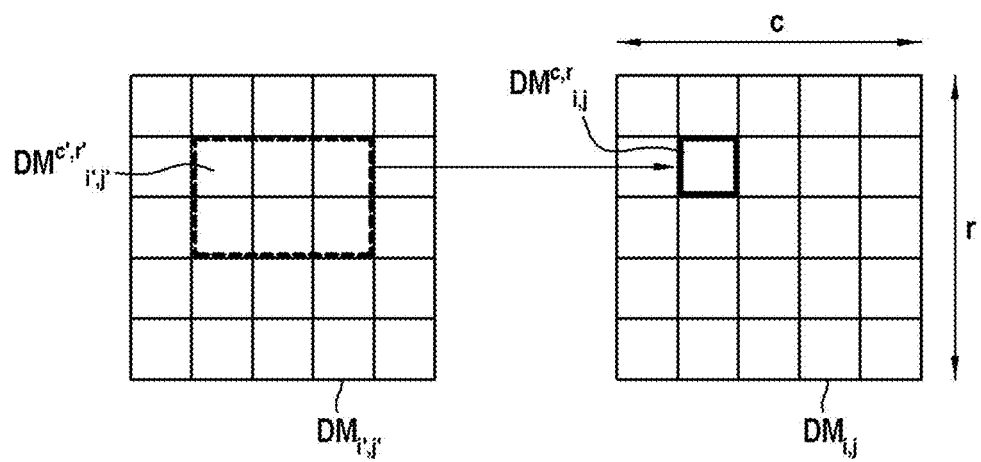
(5a)
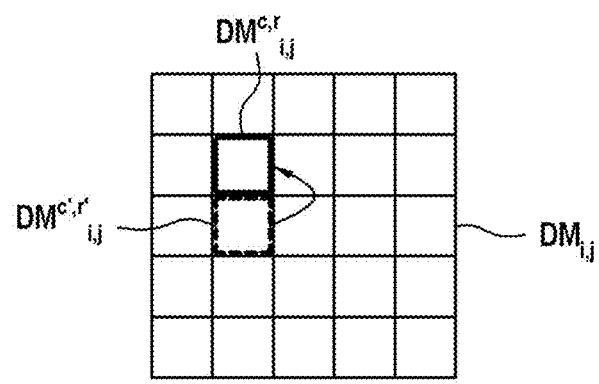
(5b)

[Fig. 6]
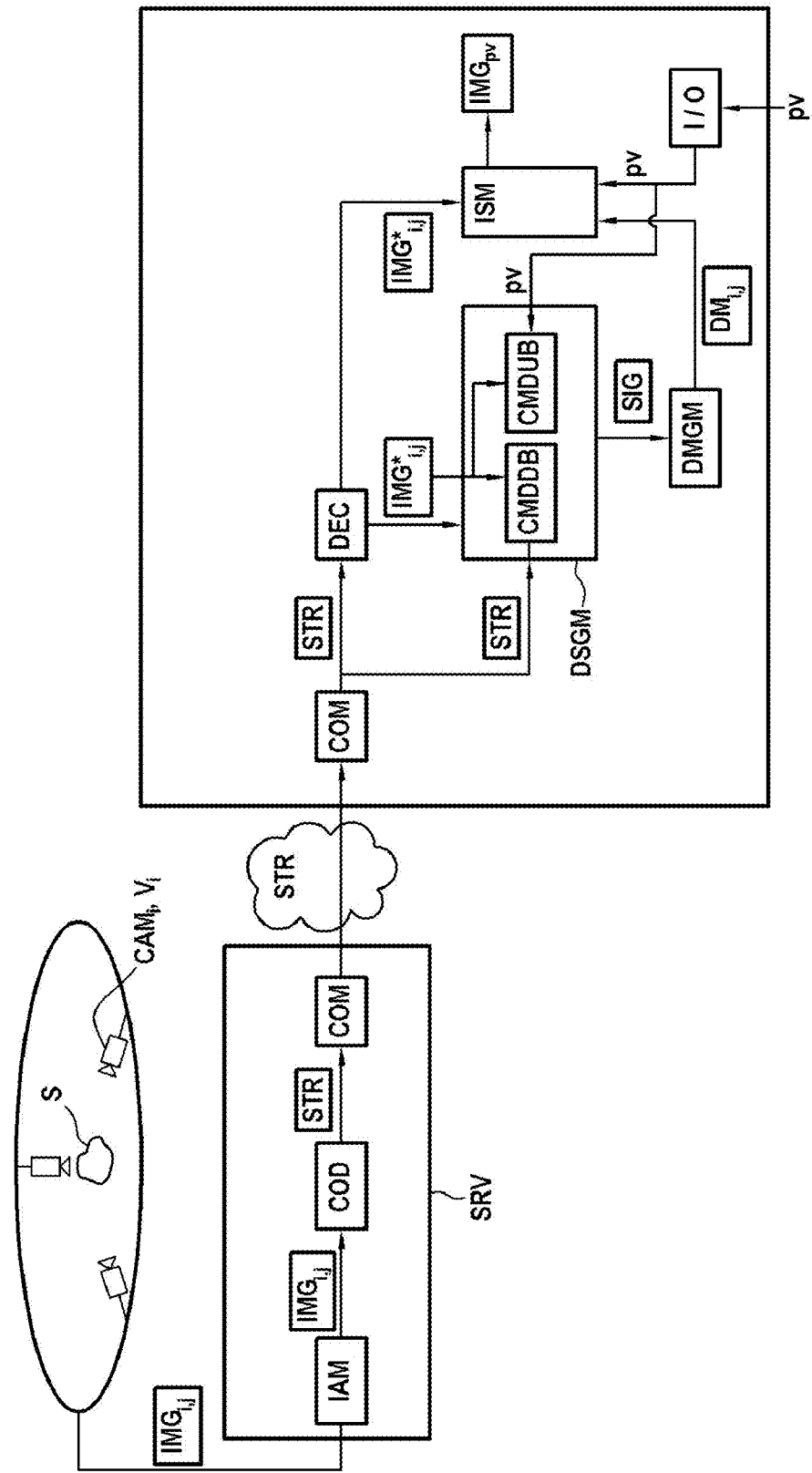

[Fig. 7]
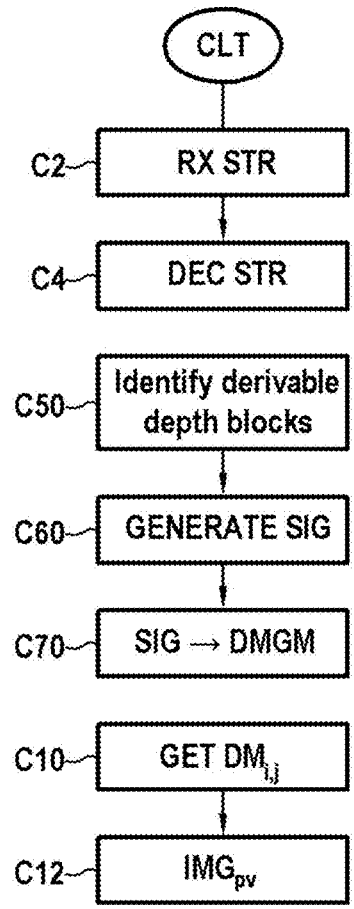
[Fig. 8]
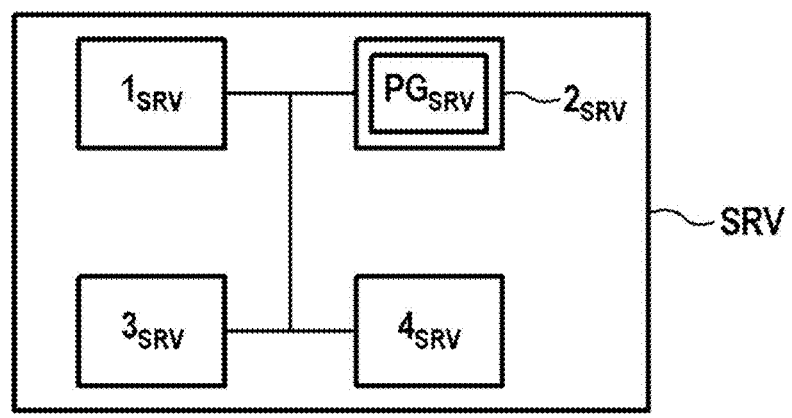

[Fig. 9]
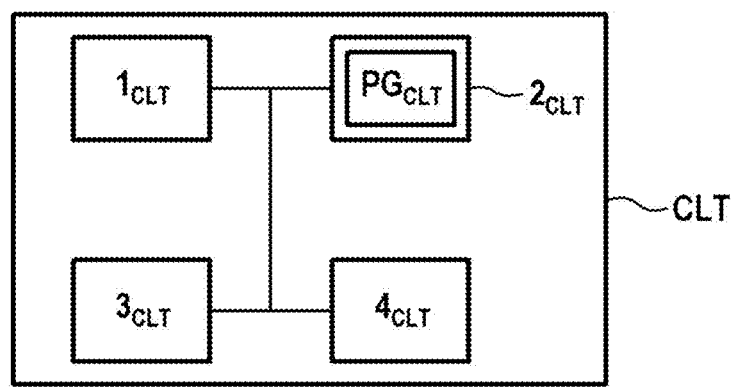

DEPTH ESTIMATION METHOD IN AN IMMERSIVE VIDEO CONTEXT

RELATED APPLICATION

This application is a continuation of International Application No. PCT/IB2021/000725, filed on Oct. 5, 2021. The disclosure of the prior application is hereby incorporated by reference in its entirety.

BACKGROUND OF THE DISCLOSURE

The disclosure relates to the general field of video communication. The disclosure can be applied to any type of video; however it finds application for interactive service, e.g. immersive video services, online gaming services, e.g provided in a cloud environment.

The disclosure applies more specifically in the context of immersive videos. In the context of immersive videos, an observer may choose a point of view from which they want to observe a scene. They can vary this point of view at any time, without the video stopping. This is the principle of "free navigation".

Most of the viewpoints requested by the observer have not been captured by a camera. It is possible to synthesize them, from nearby captured views, and depth information, by projection methods.

Computation of the depth is a traditional and solved problem in computer vision. The depth is typically obtained by triangulation, using epipolar geometry. It is easy in theory, but much more complex in practice. It requires matching all points from one frame to a point in another frame. This is possible because cameras capture the same scene. This stereo matching is made usually via optical flow methods that are very costly.

The amplitude of the displacement of an object between two cameras depends on the distance separating the object from each of the cameras. Knowing the displacement (stereo matching), allows to calculate the distance between the object and a camera, i.e. its depth. The process will typically include the following steps:
  (i) image rectification: to reduce the complexity of pixel matching, the epipolar lines of the 2 cameras are aligned horizontally. This can be made via linear transformations that rotates, translates, and skews the images:
  (ii) stereo matching (or disparity computation)
  (iii) transformation of the disparity into depth, via triangulation (epipolar geometry).

It should be noted that for steps (i) and (iii), intrinsic camera parameters (characteristics of the camera, such as focal length, resolution, etc) and extrinsic camera positions (position, angle, etc) are required.

In the following description, the complex and expensive depth calculation method described above will be referred to as the "conventional depth calculation method".

Furthermore, the viewpoints requested by the observer may not be known by the server, and therefore all captured views may potentially be needed to synthesize the requested view.

The stream and associated depth maps constitute a huge amount of data to be transmitted from the server to the client. On the client side, these contents are decoded, and then the requested view is synthesized.

There are two major problems with this approach: the data rate required to transmit this data is high (bitrate), and the amount of pixels to be decoded by the client in a very short time is high (pixel rate). To partially solve this problem, a solution consists in not transmitting the depth maps, but in estimating them on the client side, from the decoded texture views.

The problem associated with this solution is the computational complexity on the client side, as the depth maps are complex to compute. The disclosure proposes different methods to reduce this complexity and improve the quality of the depth maps.

OBJECT AND SUMMARY OF THE DISCLOSURE

The present disclosure is intended to overcome at least some of the above-mentioned disadvantages.

In an embodiment, a method of synthesizing an image includes receiving, from a server, a coded video stream corresponding to different views of a scene acquired by a plurality of cameras, and identifying one or more derivable depth blocks of a target depth map corresponding to an image of the coded video stream. The method further includes determining, for each of the one or more derivable depth blocks, a corresponding operation to derive a depth of the respective one of the one or more derivable depth blocks, the operation being applied to a depth of at least one reference depth block included in a depth map of a reference image in the coded video bitstream. The method further includes obtaining the target depth map corresponding to the image by executing, for each of the one or more derivable depth blocks, the corresponding operation of the respective derivable depth block. The method further includes synthesizing a new image according to the target depth map and at least one decoded image from the coded video stream.

In an embodiment, a method includes obtaining a plurality of images corresponding to different views of a scene acquired by a plurality of cameras, and generating a coded video stream by encoding the images. The method further includes identifying one or more derivable depth blocks of a target depth map corresponding to an image of the plurality of images. Each of the identified one or more derivable depth blocks has a depth that is derivable by executing an operation on a depth of at least one reference depth block included in a depth map of a reference image among the plurality of images.

In an embodiment, a non-transitory computer-readable storage medium stores computer-readable instructions thereon, which, when executed by processing circuitry, cause the processing circuitry to perform a method of synthesizing an image that includes receiving, from a server, a coded video stream corresponding to different views of a scene acquired by a plurality of cameras, and identifying one or more derivable depth blocks of a target depth map corresponding to an image of the coded video stream. The method further includes determining, for each of the one or more derivable depth blocks, a corresponding operation to derive a depth of the respective one of the one or more derivable depth blocks, the operation being applied to a depth of at least one reference depth block included in a depth map of a reference image in the coded video bitstream. The method further includes obtaining the target depth map corresponding to the image by executing, for each of the one or more derivable depth blocks, the corresponding operation of the respective derivable depth block. The method further includes synthesizing a new image according to the target depth map and at least one decoded image from the coded video stream.

In an embodiment, a non-transitory computer-readable storage medium stores computer-readable instructions thereon, which, when executed by processing circuitry, cause the processing circuitry to perform a method that includes obtaining a plurality of images corresponding to different views of a scene acquired by a plurality of cameras, and generating a coded video stream by encoding the images. The method further includes identifying one or more derivable depth blocks of a target depth map corresponding to an image of the plurality of images. Each of the identified one or more derivable depth blocks has a depth that is derivable by executing an operation on a depth of at least one reference depth block included in a depth map of a reference image among the plurality of images.

In this document, the term "determination of the operation" is to be understood in a broad sense. It means that the client can determine the derivation operation in some way. For example:

the type of operation may be included in the signal;
the server and the device may have previously exchanged to agree on the operation;
the operation can be predetermined and hard-coded in the server and/or in the device . . . .

The device may be a client device of the server. The device may be embedded in the terminal of an observer (i.e. a user), for example a smartphone, a tablet, a TV or a personal computer.

The device may be embedded in a cloud network device that the terminal can access. For example, the observer using the terminal may choose a viewpoint, which viewpoint is sent by the user's terminal to the device. The device may execute the method of synthesizing a new image for this viewpoint using a target depth map representing the depth of objects in the scene relative to a fictitious camera defined by said viewpoint. The device may send the new image to the terminal.

Thus, and in general, the disclosure aims to simplify the calculation of depth maps by the device according to the disclosure, the depth of at least some blocks of these depth maps being simply derived from the depth of reference depth blocks.

The disclosure makes it possible to improve the calculation speed and/or the quality of the depth map during its estimation on the client side, before synthesizing the views required by the observer.

One principle of the disclosure is to obtain and use information indicating that the calculation of the depth estimate, on the client side, of certain blocks according to the conventional depth calculation method is not necessary, as the depth of these blocks can be derived much more easily from the depth of other depth blocks.

In one embodiment, said operation to be used to derive the depth of said at least one derivable depth block does not use intrinsic or extrinsic parameters of said cameras.

In one embodiment, said operation to be used to derive the depth of said at least one derivable depth block is a linear combination of said depth of at least one reference depth block.

In one embodiment, said operation to be used to derive the depth of said at least one derivable depth block is a copy of the depth of one said reference depth block.

In one embodiment, the derivation of the depth of a derivable block is not a simple copy of the depth of a reference depth block but is a function of the depths of a certain number of blocks. For example, the median, the average, the minimum value (to favour objects in the foreground), etc. can be used.

Therefore, in one embodiment, said operation to be used to derive the depth of said at least one derivable depth block comprises calculating a mean, a median, or a minimum of a set of the depths of said at least one reference depth block.

In one embodiment, said operation to be used to derive the depth of said at least one derivable depth block comprises applying a prediction method to said at least one reference depth block.

In one embodiment, the signal comprises an identifier of at least one unnecessary depth block of said at least one target depth map, said method comprising skipping a determination of a depth of said unnecessary depth block before synthesizing said new image.

Indeed, the image to be synthesized corresponding to the point of view requested by observer does not necessarily need to have access to all the depth information of all the views of the scene. The blocks of the depth maps that are not needed to render these views do not need to be estimated and are therefore unnecessary. The location of these blocks can be obtained by projection algorithms.

In one embodiment, the signal is received from the server.

In this embodiment, an algorithm may determine, on the server side, whether for a given texture block, the depth of the corresponding block in the target depth map should be calculated or whether it can be derived from the depth of one or more reference depth blocks. When the server knows the viewpoint requested by the observer, this algorithm may also determine whether unnecessary depth blocks.

Consequently, and according to a second aspect, the disclosure relates to a method implemented in server, the method comprising:

obtaining a plurality of images corresponding to different views of a same scene acquired by a plurality of cameras;
generating a stream by encoding said images;
determining at least one derivable depth block of a target depth map corresponding to a said image, wherein a depth of said at least one derivable depth block can be derived, by executing an operation on a depth of at least one reference depth block included in a depth map corresponding to a said image;
generating a signal comprising at least an indication of said operation;
sending said stream and said signal to a device, said signal being sent according to a lossless protocol.

Correlatively, the disclosure also relates to a server comprising:

a module for obtaining a plurality of images corresponding to different views of a same scene acquired by a plurality of cameras;
a coder for generating a stream by encoding said images;
a module for determining at least one derivable depth block of a target depth map corresponding to a said, wherein a depth of said at least one derivable depth block can be derived, by executing an operation on a depth of at least one reference depth block included in a depth map corresponding to a said image;
a module for generating a signal comprising at least one information enabling said device to identify said at least one derivable depth block;
a module for sending said stream and said signal to a device, said signal being sent according to a lossless protocol.

The signal sent by the server to the device according to the disclosure must include the information necessary for the device to determine the derivable depth blocks.

In one embodiment, in a preliminary step, the server indicates the size and shape of a block to the device. There is no particular limitation regarding the size or shape of a block, even the extreme case of blocks of size 1×1. In practice, depending on the context, a compromise on the size of the blocks can be made between:
- small blocks to increase the number of derivable depth blocks, and
- large blocks to decrease the amount of information (signal size) sent by the server to the device.

In another embodiment, the signal further comprises an identifier of said at least one reference depth block.

If the device knows the size of the depth maps (number of blocks per row and column), the signal does not need to include the identifiers of the derivable blocks.

If the device knows how to determine the at least reference depth block to use to derive the depth of a given block and the operation to use, the signal does not need to include any of this information.

In one embodiment, the signal further comprises an indication of said operation.

Thus, in a particularly simple implementation, the signal only includes one bit per depth block, for example equal to 1 if the depth block is to be calculated and equal to 0 if the depth block is to be derived.

In one embodiment, the server obtains a target viewpoint selected by an observer using the client device. The server determines at least one unnecessary depth block of said at least one target depth map, wherein a depth of said unnecessary depth block is not necessary for synthesizing said new image. The server includes in the signal one information enabling the device to identify said at least one unnecessary depth block.

Therefore, in another particularly simple implementation, the signal includes a pair of bits per depth block, for example equal to "01" if the depth block is to be calculated, equal to "00" if the depth block is to be derived and equal to "11" if the depth block is unnecessary.

The bits (or pairs of bits) can be ordered in the signal according to an order known to the device. For example, if a depth maps have C columns and R rows, the order of the bits can be as follows: bit corresponding to the depth block in row 1, column 1, . . . , bit corresponding to the depth block in row 1, column C, bit corresponding to the depth block in row 2, row 1, . . . , bit corresponding to the depth block in row 2, column C, . . . , bit corresponding to the depth block in row R, column 1, . . . , bit corresponding to the depth block in row R, column C.

In another embodiment, the signal does not have a bit (or pair of bits) for each block, but explicitly to derivable depth blocks (or unnecessary depth blocks).

In one embodiment, if the depth maps are available to the server, the server may determine reference depth block, which resembles a given depth block. For example, the server may perform a motion estimation to identify the most appropriate reference depth block.

In a variant, the server determines a set of candidate reference depth blocks, and selects in the set, the one that most resembles a given depth block. The two approaches can be considered as identical if the motion estimation is validated by a difference (or proximity) criterion on the two blocks.

In practice, it is frequent that depth maps and textures have relatively close or similar contours.

Therefore, in a particular embodiment, the server determines the candidate reference depth blocks as the depth blocks corresponding to candidate texture blocks determined by the server by analysing the images acquired by the cameras and not from the depth maps, for example by motion estimation. This embodiment is particularly interesting when the depths are not available on the server side.

For example, for a given derivable depth block at a given location in the target depth map, candidate texture blocks may be:
- texture blocks in the image corresponding to the target depth map, in the vicinity of the given location or at a location offset from the given location by a motion vector computed for the texture or computed for deriving the depth of derivable depth block; or
- texture blocks in a previous image of the same view, either at the same location (collocated) or at a location shifted by a known motion vector; or
- texture blocks located at another location in an image of another view, e.g. shifted by a disparity vector.

Therefore, in one embodiment, the server obtains at least one reference depth block:
- using a motion estimation method applied to at least one said image; or
- using a motion estimation method applied to at least one depth map corresponding to a said image; or
- in a list of at least one candidate block determined for said at least one derivable depth block wherein said candidate block is:
  - a block in the neighbourhood of said at least one depth derivable block in said depth map; or
  - a block at the location of said at least one derivable depth block in a depth map corresponding to another said image.

A similarity criterion may be used to perform motion estimation, disparity estimation, or proximity checking of candidate blocks.

The similarity criteria may be SAD (Sum of absolute differences) or SSD (Sum of squared differences) which may or may not be used in the minimization of a Lagrangian that takes into account the cost of additional information to be transmitted.

A machine learning algorithm may also be used able to recognize similar areas.

A machine learning algorithm that directly selects the blocks to be dropped may also be used. This algorithm will not only rely on similarity criteria between blocks, but will use features extracted from the different blocks to find the blocks to be derived. This algorithm will have been trained beforehand, in a supervised way, with as validation data an information mentioning if the block should be derived or not.

In one embodiment, the server transmits a residual depth block of pixels corresponding to the difference between a given depth block and the reference depth block (found among the pre-selected candidates, or by motion estimation).

Therefore, in one embodiment, the signal sent by the server further comprises an identifier of at least one residual depth block that may be added by the device to said at least one reference depth block to obtain said derivable depth block.

The signal may indicate:
- the type of derivation. The derivation may be "direct", i.e. based on reference depth blocks or "by residual", i.e. based on residual reference depth blocks:
- the at least one reference depth block to use for derivation:
  - the block may be identified explicitly or indirectly (left neighbour, top neighbour, collocated, . . . );

the view of the at least one reference depth block: the view may be identified explicitly or indirectly (left neighbour view, view at the end of the scene, . . . );

the frame in the view: the frame may be identified explicitly or indirectly (previous frame, current frame—n, . . . ).

When the signal is sent by the server to the device, the transmission is made using a lossless protocol. A source coding may be applied (entropic coding, adaptive arithmetic coding, etc) to reduce the amount of data to be transmitted.

The signalling may take the form of a standardized data flow, transmitted by the server and whose use is made mandatory at the client side.

The signalling may also take the form of an supplemental enhancement information message (SEI message), transmitted by the server. The client that uses this message can accelerate its processing; the client that does not use it applies a classic processing.

In another embodiment, the signal is not received from the server, but it is calculated by the device. This embodiment may apply in particular when the server is not able to obtain the depth maps, or in a case of limited bandwidth between the server and the client.

Therefore, in one embodiment, the method of synthesizing an image implemented in the device comprises:
  decoding the stream received from the server to obtain decoded images;
  determining the least one derivable depth block of a target depth map corresponding to a said decoded image, wherein the depth of said at least one derivable depth block can be derived by executing an operation on a depth of at least one reference depth block included in a depth map corresponding to a said decoded image;
  generating said signal, wherein said signal comprises one information enabling to identify said at least said at least one derivable depth block; and
  sending said signal to a module of said device, said module being configured to obtain said target depth map by executing said at least one operation.

The signal generated by said device may also include the indication of said operation and/or an identifier of said at least one reference depth bloc whether this information is known to said module.

In one embodiment, the device determines said at least one derivable depth block by parsing said stream.

For example, a block coded in Skip or Merge mode indicates that there has been little or no change in that same block from one image to another in the same view. Conversely, the use of an Intra block is a strong indication of the opposite phenomenon.

Therefore, in one embodiment, the device may consider that the depth blocks corresponding to texture blocks coded in Skip or Merge mode are derivable blocks.

In one embodiment, the device determines said at least one derivable depth block by analysing said decoded images. The decoding step is the step performed after the stream parsing, in order to obtain the decoded pixels. Once these pixels are decoded, it is possible to calculate different criteria identical to those described previously, but this time applied to the decoded pixels.

The decoded pixels typically contain coding artifacts. A variant consists in reducing these artefacts by traditional algorithms, before making the calculations to obtain derivable or unnecessary depth blocks.

In one embodiment, motion vectors may also be reconstructed after parsing the stream. These motion vectors may be used directly, as they show the movement from one image to another in the same view. Similarly, the disparity vectors reflect the movement from one view to another for the same image.

In one embodiment, residual texture blocks may be used. For example, if the device determines that texture residual between a given texture block and a reference texture block is low (on the texture pixels), the device may consider that there is a good match of these texture blocks, and that the depth of a depth block corresponding to the given texture block may be derived from the depth the reference texture block using the texture motion vectors.

Therefore, in one embodiment of the method of synthesizing implemented in the device, the at least one reference depth block is obtained by said device:
  using a motion estimation method applied to at least one said decoded image; or
  using a motion estimation method applied to at least one depth map corresponding to at least one decoded image; or
  in a list of at least one candidate block determined for said at least one depth derivable block wherein said candidate block is:
    a block in the neighbourhood of said at least one depth derivable block in said target depth map; or
    a block at the location of said at least one derivable depth block in a depth map corresponding to another said decoded image.

The disclosure also concerns a computer program comprising instructions configured to implement the steps of the method of synthesizing an image when this computer program is executed by a computer.

The disclosure also concerns a computer program comprising instructions configured to implement the steps of the method implemented in a server when this computer program is executed by a computer.

These programs can use any programming language, and be in the form of source code, object code, or intermediate code between source code and object code, such as in a partially compiled form, or in any other desirable form.

The disclosure also concerns a readable medium comprising at least one computer program of this set of computer programs.

The recording medium can be any entity or device capable of storing the program. For example, the support may include a storage means, such as a ROM, for example a CD ROM or a microelectronic circuit ROM, or also a magnetic recording means, for example a hard disk.

On the other hand, the recording medium can be a transmissible medium such as an electrical or optical signal, which can be carried via an electrical or optical cable, by radio or by other means. The program according to the disclosure can in particular be downloaded on an Internet-type network.

Alternatively, the recording medium can be an integrated circuit in which the program is incorporated, the circuit being adapted to execute or to be used in the execution of the method in question.

BRIEF DESCRIPTION OF THE DRAWINGS

Other characteristics and advantages of the present disclosure will emerge from the description given below, with reference to the appended drawings which illustrate exemplary embodiments thereof devoid of any limiting character. In the figures:

FIG. 1 shows an image and its associated depth map.

FIG. 2 shows a server and a device according to an embodiment of the disclosure.

FIG. 3 represents in flowchart the main steps of a method implemented by the server and the main steps of a method implement by the device in an embodiment of the disclosure;

FIG. 4a shows a signal according to an embodiment of the disclosure.

FIG. 4b shows a signal according to an embodiment of the disclosure.

FIG. 5 shows different possible operations to derive the depth of a block of a depth map from the depth of at least one reference depth block.

FIG. 6 shows a server and a device according to an embodiment of the disclosure.

FIG. 7 represents in flowchart the main steps of a method implemented by the server and the main steps of a method implement by the device in an embodiment of the disclosure;

FIG. 8 illustrates the hardware architecture of a server according to a particular embodiment of the disclosure;

FIG. 9 illustrates the hardware architecture of a client device according to a particular embodiment of the disclosure.

DETAILED DESCRIPTION OF EMBODIMENTS OF THE DISCLOSURE

FIG. 1 shows an IMG image and an associated DM depth map. It shows that contours of the IMG image can be found on the DM depth map. We define the following notations:

$IB^{c,r}$: image block (or texture block) located at column c, row r;

$DB^{c,r}$: depth block located at column c, row r.

FIG. 2 shows a server SRV and a device CLT according to an embodiment of the disclosure. In this embodiment the device CLT is embedded in the terminal of a user or observer. Alternatively, the CLT device could be implemented in a cloud-based network.

FIG. 3 represents in flowchart the main steps of a method implemented by the server and the main steps of a method implement by the device in an embodiment of the disclosure.

This embodiment is in the context where the server SRV can produce depth maps but does not send them to the device CLT.

The server SRV is connected via an image acquisition module IAM to cameras $CAM_i$, configured to acquire images $IMG_{i,j}$ of a scene S where i is an index of the views $V_i$ and j an index of the frame.

In this embodiment, we consider that each camera CAM is associated with a device not shown and configured to produce depth maps $DM_{i,j}$ for each of the images $IMG_{i,j}$. The server obtains these images during a step S2. For example, a plurality of images are obtained corresponding to different views of a scene acquired by a plurality of cameras.

The SRV server includes an encoder COD configured to produce (step S4) a video stream STR from the images $IMG_{i,j}$. For example, a coded video stream is generated by encoding the images.

The server SRV includes a signal generation module SSGM configured to generate (step S10) a signal SIG comprising information enabling the device CLT to identify the derivable depth block $DB^{c,r}_{i,j}$ included in the depth maps $DM_{i,j}$. For example, one or more derivable depth blocks of a target depth map are identified corresponding to an image of the plurality of images. Each of the identified derivable depth blocks has a depth that is derivable by executing an operation on a depth of at least one reference depth block included in a depth map of a reference image among the plurality of images. A signal indicating the one or more derivable depth blocks is generated.

FIG. 4a shows the signal SIG according to an embodiment of the disclosure. In this embodiment, the device CLT is assumed to know:

the size of the depth maps (number of blocks per row and column); and the operation $op^{c,r}_{i,j}$ to derive the depth $dp^{c,r}_{i,j}$ of a derivable block $DB^{c,r}_{i,j}$.

For example, this operation may simply consist in using the depth of the block to the left of the current depth block.

$$op^{c,r}_{i,j}: dp^{c,r}_{i,j} = dp^{c-1,r}_{i,j}$$

Indeed, in this embodiment, the signal SIG only includes one bit per depth block, for example equal to 1 if the depth block is to be calculated using the conventional depth calculation method and equal to 0 if the depth block is to be derived.

FIG. 4b shows the signal SIG according to an embodiment of the disclosure. It is represented for two depth maps $DM_{i,j}$, $DM_{k,l}$. In this embodiment, the signal SIG includes, for each depth block $DB^{c,r}_{i,j}$ of each depth map:

a block identifier $DB^{c,r}_{i,j}$;

an attribute that indicates whether the depth $dp^{c,r}_{i,j}$ of the block should be:
(i) computed using the conventional depth calculation method (tbc); or
(ii) derived (d);
(iii) simply ignored or skipped (u) when the depth of the depth block is considered to be unnecessary for synthesizing the new image; and for derivable blocks, an indication of the operation $op^{c,r}_{i,j}$ required to derive this depth $dp^{c,r}_{i,j}$.

In another embodiment (not shown), the signal SIG may also comprise the identifiers of the reference depth blocks $DB^{c',r'}_{i,j}$, $DB^{c',r'}_{i',j'}$ or the identifiers of residual depth blocks $DBR^{c',r'}_{i,j}$ based on which the depth $dp^{c,r}_{i,j}$ or a given depth block can be derived.

FIG. 5 shows different possible operations to derive the depth of a block $DM^{c,r}_{i,j}$ of a depth map $DM_{i,j}$ from the depth of at least one reference depth block, shown in dashed lines.

For example, the reference depth block can be:

a block $DB^{c',r'}_{i',j'}$ of another depth map $DM_{i',j'}$ (FIG. 5a) or a block $DB^{c',r'}_{i,j}$ of the same depth map $DM_{i,j}$ (FIG. 5b).

Different methods may be used by the server to identify (step S8) the at least one reference depth block. For example, the server SRV obtains these reference depth blocks:

using a motion estimation method applied to the images $IMG_{i',j'}$; or using a motion estimation method applied to depth maps $DM_{i',j'}$;

in a list of candidate blocks $DM^{c',r'}_{i',j'}$ determined a given derivable depth block $DM^{c,r}_{i,j}$, wherein said candidate block is:

a block in the neighbourhood (c',r') of the given depth derivable block in the same depth map $DM_{i,j}$; or a block at the location (c,r) of the given derivable depth block in a depth map $DM_{i',j'}$, corresponding to another image $IMG_{i',j'}$, typically the previous frame in the same view.

The coordinates c', r' of a reference block $DB^{c',r'}_{i',j'}$, $DB^{c',r'}_{i,j}$ can be close to those of the current depth block $DB^{c,r}_{i,j}$. A more distant reference block can also be chosen, if the correspondence with the current depth block is better.

In the embodiment of FIG. 2, the signal generation module SSGM includes a module SMDDB for determining the derivable depth blocks and a module SMDUB for determining the unnecessary depth blocks.

The server SRV includes a communication module COM for sending (step S12) the video stream STR and the signal SIG to the device CLT. For example, the coded video stream and the signal are sent to a decoder device according to a lossless protocol.

The signal SIG is sent according to a lossless protocol. It may be sent in the form of a SEI message.

The device CLT receives the STR stream and the signal SIG through a communication module COM (step C2). It includes a decoder to decode (step C4) the stream STR and retrieve decoded images $IMG^*_{i,j}$. For example, a coded video stream corresponding to different views of a scene acquired by a plurality of cameras is received from a server.

The device CLT includes a module DMGM configured to generate a (step C10) target depth map $DM_{i,j}$ form the received signal SIG.

This target map Dm, can be used to synthesize (step C12) a new image $IMG_{pv}$ according to a viewpoint pv selected by the observer. In the embodiment described here, the CLT device includes an I/O module via which the user may select this viewpoint.

This module DMGM is configured to analyse (step C6) the signal SIG and to identify the derivable depth blocks in the target depth map $DM_{i,j}$. For example, one or more derivable depth blocks of a target depth map corresponding to an image of the coded video stream are identified.

For example, if the client receives the signal SIG of FIG. 4a, it determines that each bit equal to 1 corresponds to a depth block that must be calculated using the conventional depth calculation method and that each bit equal to 1 corresponds to a derivable depth block.

In another example, if the client receives the signal SIG of FIG. 4b, it determines for each depth block $DB^{c,r}_{i,j}$ of a depth map, whether the depth $dp^{c,r}_{i,j}$ of the block should be:
(i) computed using the conventional depth calculation method (tbc); or
(ii) derived (d);
(iii) simply ignored or skipped (u) when the depth of the depth block is considered to be unnecessary for synthesizing the new image.

For each derivable block, the module DMGM also determines (step C8) the operation $op^{c,r}_{i,j}$ required to derive this depth $dp^{c,r}_{i,j}$. For example, a corresponding operation is determined for each derivable depth block to derive a depth of the respective derivable depth block, the operation being applied to a depth of at least one reference depth block included in a depth map of a reference image in the coded video bitstream.

In one embodiment, the server SRV and the client preliminary agreed on the operation to be performed to derive the depth of a given depth block from the depth of one or several depth blocks.

The module DMGM obtains the target depth map $DM_{i,j}$ by executing said at least one operation $op^{c,r}_{i,j}$. For example, the target depth map corresponding to the image is obtained by executing, for each derivable depth block, the corresponding operation of the respective derivable depth block.

In this embodiment, the device CLT comprises a module ISM for synthesizing a new image $IMG_{PV}$ by using said target depth map $DM_{i,j}$ and at least one image $IMG^*_{i,j}$ obtained by decoding said stream STR. For example, a new image a new image is synthesized according to the target depth map and at least one decoded image from the coded video stream.

In a detailed example of this embodiment, the server SRV sends a SEI message indicating the derivable blocks.

At the server side, an immersive video containing 30 views was captured around a stadium by a multi-camera device. Depth maps were not captured, and were not computed. Each block, square in shape and 32×32 in size, of each image in each view is studied successively. A SAD criterion is applied between the current block and its collocated block (same view, previous image). If the value of the SAD is lower than a predefined threshold, it is considered that there has been no significant change in this block for the texture. It is then assumed that there has been no significant change in this block for the depth. For a set of 3 consecutive blocks, the following string is created: 0210000101.
0: square block indication
2: indication of 32×32 size (1 for 16×16, etc)
1: indication of block to derive
0: direct derivation (1 for residual derivation)
0: use of collocated (1 for top, 2 for left, etc).
0: block indication to be calculated
0: block indication to calculate
1: indication of block to derive
0: direct inheritance (1 for residual)
1: use of the top block This string is losslessly coded with a Huffman coding, which transforms it into a sequence of 0's and 1's. This string, associated with that of the other blocks, is transmitted to the client in a SEI message.

On the client side CLT, the SEI message is read, and decoded (reverse Huffman). The string 0210000101 is found. The client knows that for the 1st square block, of size 32×32, the depth must not be calculated but must be directly derived from the collocated block. It then knows that for the next 2 blocks, the depth must be computed, and that the next one must be derived from the depth of the top block.

FIG. 6 shows a server SRV and a device CLT according to an embodiment of the disclosure.

FIG. 7 represents in flowchart the main steps of a method implemented by the device in this embodiment.

In this embodiment the server SRV does not produce depth maps. The SRV server only sends the video stream STR to the device CLT (received at step C2).

In this embodiment, the client includes a module DSGM to generate (step C60) the signal SIG comprising the information enabling to identify derivable depth blocks of a target depth map. In this embodiment, the derivable depth blocks are depth blocks whose depth can be derived by executing an operation on a depth of at least one reference depth block included in a depth map $DM_{i,j}$ corresponding to a decoded image $IMG^*i, j$, $IMG^*_{i',j'}$.

In one embodiment, the module DSGM is configured to send (step C70) the signal to a module DMGM configured to generate a target depth map $DM_{i,j}$ from the signal SIG. This module DMGM may be similar to the module of the same name described above in reference to FIG. 2.

In one embodiment, the derivable depth blocks may be determined (step C50) by a sub module CMDDB configured to parse the video stream STR and/or to analyse the decoded images $IMG^*_{i,j}$.

For example the sub-module CMDDB may parse the stream STR to identify texture blocks that have been coded in Skip, Merge or Intra modes and may determine that depth blocks corresponding to texture blocks coded in Skip or Merge mode are derivable blocks.

In one embodiment, the module DSGM configured to generate the signal SIG obtains the reference depth blocks:
- using a motion estimation method applied to at least one said decoded image $IMG^*_{i',j'}$; or
- using a motion estimation method applied to at least one depth map $DM_{i',j'}$ corresponding to at least one decoded image; or
- in a list of at least one candidate block determined for a given derivable block $DM^{c,r}_{i,j}$, wherein said candidate block is:
  - a block in the neighbourhood of the given depth derivable block in the target depth map or;
  - a block at the location of said at least one derivable depth block in a depth map $DM_{i',j'}$, corresponding to another decoded image $IMG_{i',j'}$.

In one embodiment, the module DMGS configured to generate the signal SIG further includes a a sub module CMDDB configured to identify the depth blocks whose depth is not necessary to synthesize a new image $IMG_{pv}$ for given point of view pv.

In a detailed example of this embodiment, a client CLT reads syntax elements from a video stream to identify derivable depth blocks.

In this second example there is no special processing at the server side. All the views have been encoded in the classical way with a 2D or 3D encoder, and the video stream is transmitted to the client.

At the client side, for a given texture block, the pixel residuals are studied. It turns out that their average amplitude is very low, which indicates that this block was perfectly predicted by the encoder. Parsing the stream also indicates that this block was coded in Inter mode, with a disparity vector (+5, −10). Therefore, the client infers that it is possible to re-use the depth pixels located in another view, in the same frame, in a block moved by (+5, −10) pixels.

As illustrated in FIG. 7, the server SRV comprises in particular a processor (processing circuitry) $1_{SRV}$, a random access memory $3_{SRV}$, a read-only memory $2_{SRV}$, a Non-Volatile Flash memory $4_{SRV}$.

The read-only memory $2_{SRV}$ constitutes a non-transitory recording medium according to the disclosure, readable by the processor $1_{SRV}$ and on which a computer program $PG_{SRV}$ according to the disclosure is recorded.

The computer program $PG_{SRV}$ defines the functional (and here software) modules of the server 100.

In the embodiment of FIG. 2, these functional modules comprise:
- the module IAM for obtaining the plurality of images $IMG_{i,j}$;
- the encoder COD for generating the video stream STR;
- the module SSGM for determining the derivable depth blocks and for generating the signal SIG;
- the communication module for sending the video stream STR and the signal SIG to the client CLT.

As illustrated in FIG. 8, the device CLT comprises in particular a processor (processing circuitry) $1_{CLT}$, a random access memory $3_{CLT}$, a read-only memory $2_{CLT}$, a non-volatile flash memory $4_{CLT}$.

The read-only memory $2_{CLT}$ constitutes a non-transitory recording medium according to the disclosure, readable by the processor $1_{CLT}$ and on which a computer program $PG_{CLT}$ according to the disclosure is recorded.

The computer program $PG_{CLT}$ defines the functional (and here software) modules of the device CLT.

In the embodiment of FIG. 2, these functional modules comprise:
- the decoder DEC;
- the module DMGM configured to-analyse the signal SIG received from the server SRV and to obtain a target depth map; and
- the module ISM for synthesizing a new image.

In the embodiment of FIG. 6, these functional modules comprise:
- the decoder DEC;
- the module SSGM for determining the derivable depth blocks and for generating the signal SIG;
- the module DMGM configured to-analyse the signal SIG received from the module SSGM and to obtain a target depth map; and
- the module ISM for synthesizing a new image.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

The invention claimed is:

1. A method of synthesizing an image, the method comprising:
   receiving, from a server, a coded video stream corresponding to different views of a scene acquired by a plurality of cameras;
   identifying one or more derivable depth blocks of a target depth map corresponding to an image of the coded video stream, wherein the target depth map represents a depth of the one or more derivable depth blocks;
   determining, for each of the one or more derivable depth blocks, a respective depth derivation operation to derive the depth of the respective derivable depth block;
   deriving each of the one or more derivable depth blocks based on the depth derivation operation of the respective derivable depth block and a depth of at least one reference depth block that is associated with the respective derivable depth block, the depth derivation operation being applied to the depth of the at least one reference depth block that is included in a depth map of a reference image in the coded video stream;
   obtaining the target depth map corresponding to the image by executing, for each of the one or more derivable depth blocks, the respective depth derivation operation of the respective derivable depth block; and
   synthesizing a new image according to the target depth map and at least one decoded image from the coded video stream.

2. The method according to claim 1, wherein the identifying is based on a signal received from the server.

3. The method according to claim 2, wherein the signal is received in a supplemental enhancement information message.

4. The method according to claim 1, further comprising: decoding the coded video stream to obtain decoded images that include the image and the reference image.

5. The method according to claim 4, wherein the one or more derivable depth blocks are obtained by parsing the coded video stream.

6. The method according to claim 4, wherein the one or more derivable depth blocks are determined by analyzing the decoded images.

7. The method according to claim 4, further comprising obtaining the at least one reference depth block by at least one of:
   using a motion estimation method applied to at least one of the decoded images; or
   using a motion estimation method applied to at least one depth map corresponding to at least one of the decoded images; or
   generating a list of at least one candidate block determined for a respective derivable depth block, wherein the at least one candidate block is:
      a block adjacent to the respective derivable depth block in the target depth map of the image; or
      a block at a location of the respective derivable depth block in a depth map of another decoded image of the decoded images.

8. The method according to claim 1, wherein a signal received from the server further indicates the respective depth derivation operation for deriving each of the derivable depth blocks.

9. The method according to claim 1, wherein a signal received from the server further comprises a respective identifier of the at least one reference depth block for deriving each of the derivable depth blocks.

10. The method according to claim 1, wherein the respective depth derivation operation for deriving the depth of each of the one or more derivable depth blocks does not use intrinsic or extrinsic parameters of the plurality of cameras.

11. The method according to claim 1, wherein the respective depth derivation operation for deriving the depth of one of the one or more derivable depth blocks is a linear combination of depths of two or more reference depth blocks.

12. A method comprising:
   obtaining a plurality of images corresponding to different views of a scene acquired by a plurality of cameras;
   generating a coded video stream by encoding the images;
   identifying one or more derivable depth blocks of a target depth map corresponding to an image of the plurality of images, wherein each of the identified one or more derivable depth blocks has a depth that is derivable by executing a respective depth derivation operation on a depth of at least one reference depth block included in a depth map of a reference image among the plurality of images, wherein the target depth map represents the depth of the one or more derivable depth blocks;
   generating a signal indicating the one or more derivable depth blocks; and
   sending the coded video stream and the signal to a decoder device according to a lossless protocol.

13. The method according to claim 12, further comprising obtaining the at least one reference depth block by at least one of:
   using a motion estimation method applied to at least one of the plurality of images; or
   using a motion estimation method applied to at least one depth map corresponding to at least one of the plurality of images; or
   generating a list of at least one candidate block determined for a respective derivable depth block, wherein the at least one candidate block is:
      a block adjacent to the respective derivable depth block in the target depth map corresponding to the image; or
      a block at a location of the respective derivable depth block in a depth map of another image of the plurality of images.

14. The method according to claim 12, comprising:
   obtaining a viewpoint selected by an observer;
   determining at least one unnecessary depth block of the target depth map, wherein a depth of the at least one unnecessary depth block is not necessary for synthesizing a new image according to the target depth map and at least one of the plurality of images; and
   indicating, in the signal, the at least one unnecessary depth block.

15. The method according to claim 12, wherein the signal further indicates a respective depth derivation operation for deriving each of the derivable depth blocks.

16. The method according to claim 12, wherein the signal further comprises a respective identifier of the at least one reference depth block for deriving each of the derivable depth blocks.

17. The method according to claim 12, wherein the respective depth derivation operation for deriving the depth of each of the one or more derivable depth blocks does not use intrinsic or extrinsic parameters of the plurality of cameras.

18. The method according to claim 12, wherein the respective depth derivation operation for deriving the depth of one of the one or more derivable depth blocks is a linear combination of depths of two or more reference depth blocks.

19. The method according to claim 12, wherein the respective depth derivation operation for deriving the depth of one of the one or more derivable depth blocks is a copy of a depth of a reference depth block.

20. An apparatus, comprising:
   processing circuitry configured to
      receive, from a server, a coded video stream corresponding to different views of a scene acquired by a plurality of cameras;
      identify one or more derivable depth blocks of a target depth map corresponding to an image of the coded video stream, wherein the target depth map represents a depth of the one or more derivable depth blocks;
      determine, for each of the one or more derivable depth blocks, a respective depth derivation operation to derive the depth of the respective derivable depth block
      derive each of the one or more derivable depth blocks based on the depth derivation operation of the respective derivable depth block and a depth of at least one reference depth block that is associated with the respective derivable depth block, the depth derivation operation being applied to the depth of the at least one reference depth block that is included in a depth map of a reference image in the coded video stream;
      obtain the target depth map corresponding to the image by executing, for each of the one or more derivable depth blocks, the respective depth derivation operation of the respective derivable depth block-; and
synthesize a new image according to the target depth map and at least one decoded image from the coded video stream.

\* \* \* \* \*